United States Patent [19]

Nakajima

[11] Patent Number: 4,470,683
[45] Date of Patent: Sep. 11, 1984

[54] FOCUSSING CONDITION DETECTOR
[75] Inventor: Yukio Nakajima, Kanagawa, Japan
[73] Assignee: Olympus Optical Company Ltd., Tokyo, Japan
[21] Appl. No.: 483,769
[22] Filed: Apr. 11, 1983
[30] Foreign Application Priority Data Jun. 29, 1982 [JP] Japan .............................. 57-111999

[51] Int. Cl.³ .............................................. G03B 3/10
[52] U.S. Cl. .................................... 354/406; 354/409
[58] Field of Search .............. 354/402, 406, 408, 409, 354/432

[56] References Cited
FOREIGN PATENT DOCUMENTS 56-51705 5/1981 Japan .

Primary Examiner—Michael L. Gellner
Attorney, Agent, or Firm—Louis Weinstein

[57] ABSTRACT

A focussing condition detector effects a photoelectric conversion of a focussing condition on the imaging plane of a focussing lens. An output from the conversion is subject to an arithmetic operation which derives an evaluation value according to a given formula. The evaluation value is compared against a decision level in order to produce a decision output which indicates whether the focussing condition achieved by the focussing lens is in an in-focus or an out-of-focus condition. A decision level is offset from a threshold value between two regions each representing the in-focus and the out-of-focus condition, respectively, in both directions. When an evaluation value moves from the region representing the in-focus condition into the other region representing the out-of-focus condition, one of the decision levels which is offset in one direction from the threshold value is used. When the evaluation value moves in the opposite direction, the other decision level is used. By thus incorporating hysteresis in the decision level used in the comparison process, a small, but rapid change in the decision output is prevented even in the presence of extraneous fluctuations.

10 Claims, 5 Drawing Figures

FOCUSSING CONDITION DETECTOR

BACKGROUND OF THE INVENTION

The invention relates to a focussing condition detector, and more particularly, to a focussing condition detector in which light impinging upon an imaging surface of the detector is subject to a photoelectric conversion to derive a signal which is evaluated according to a given formula by way of an arithmetic operation, the result of which is utilized to indicate an in-focus or out-of-focus condition.

A focusing condition detector is known in which light from an object being photographed which impinges upon an imaging surface is electrically detected by a photoelectric transducer element and then converted into digital form for arithmetic operation, the result of which is utilized to indicate a focussing condition or to drive an imaging lens into a position corresponding to an in-focus condition. In such an arrangement, a blur between the detector and the object being photographed and electrical noise as well as their quantization errors all contribute to the total noise. This causes unnecessary concern and inconvenience to a user since a display element which is used to indicate a focussing condition may flash and flicker in a boundary region between an in-focus and an out-of-focus condition or the lens is continually oscillated by an associated drive motor over a very limited range, resulting in a failure to fix its position.

SUMMARY OF THE INVENTION

In view of the foregoing, it is an object of the invention to provide a focussing condition detector which prevents flickering of the display or a dither-like oscillation of the lens from occurring by incorporating a hysteresis response in the evaluation process for a boundary region between an in-focus and an out-of-focus condition.

According to the invention, a decision level upon which the evaluation is based exhibits a hysteresis between its movement from an in-focus region to an out-of-focus region and between its movement from an out-of-focus region into an in-focus region. Accordingly, in a boundary region between the in-focus and the out-of-focus region, a change which might occur in the result of evaluation and attributable to a blur or electrical noise cannot cause a small, but rapid variation in an evaluation output, thus preventing the occurrence of flashing and flickering of the display element of a fore-and-aft movement of the lens across a threshold point to cause concerns and inconveniences to a user.

DESCRIPTION OF A PREFERRED EMBODIMENT

Figure 1:
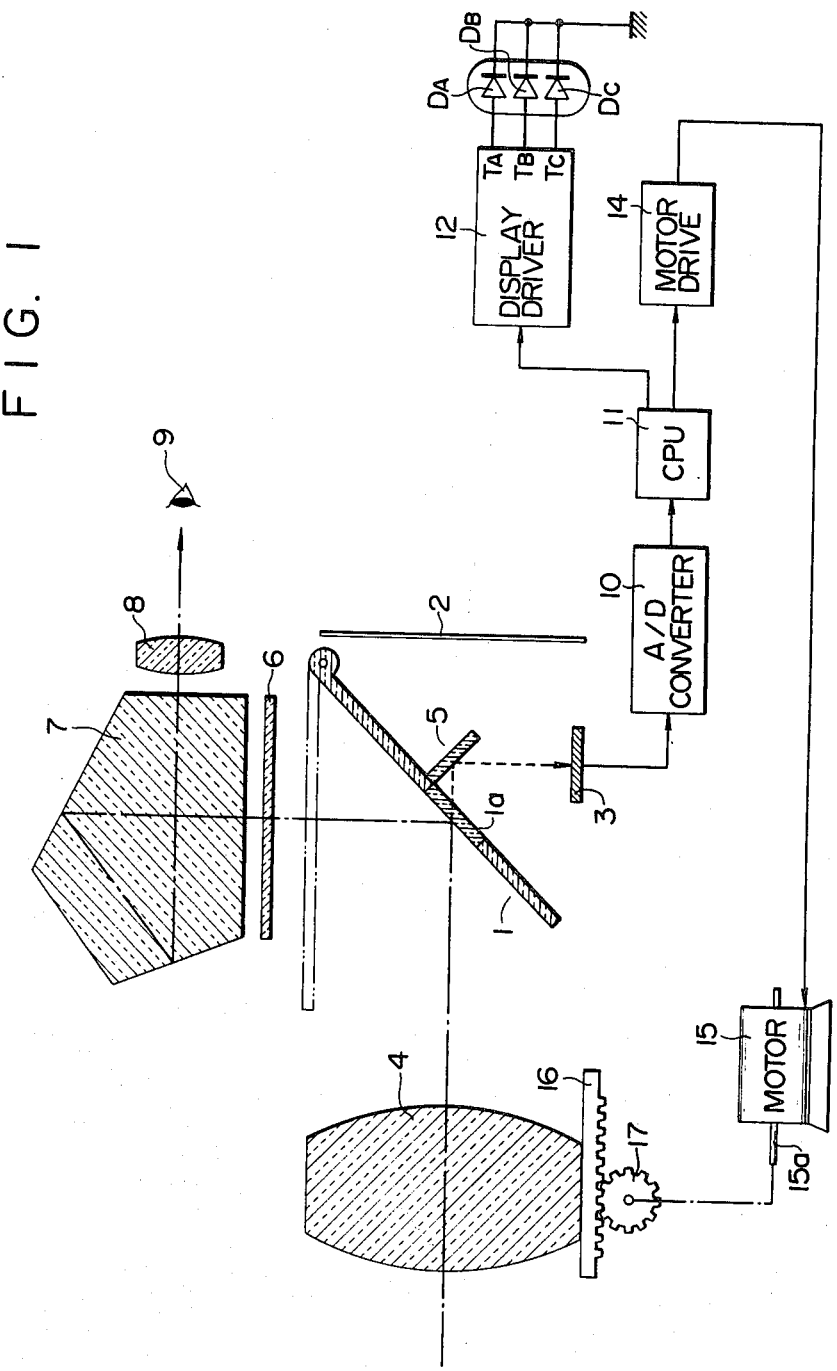
FIG. 1 is a schematic view of a focussing condition detector according to one embodiment of the invention.

Referring to FIG. 1, there is shown a focussing condition detector according to the invention as applied to a single lens reflex camera. The camera includes a movable reflecting mirror 1, and a photoelectric transducer element 3, which operates to detect a focussing condition, is disposed at an imaging position which is conjugate to a photographic film 2, generally below the reflecting mirror 1 to avoid an interference with a taking light path. When the mirror 1 assumes its lower position, light from an object being photographed which transmits through the mirror 4 partly transmits through a semi-transmitting area 1a of the mirror 1 to be reflected by an auxiliary mirror 5 which is integrally mounted on the back side of the mirror 1 so as to be projected toward a light receiving surface of the transducer element 3. That portion of the light from an object being photographed which does not transmit through the area 1a is reflected in the upward direction by the mirror 1 to be observed by the eye 9 of a photographer through an optical path including a focussing screen 6, pentaprism 7 and eyepiece 8. The transducer element 3 comprises a plurality of aligned CCD (charge coupled devices) which define light receivers of reduced area. As the light from an object being photographed is projected onto the light receiving surface of the transducer element 3, the latter stores an electric charge in accordance with an optical image formed thereon to provide an integrating operation. The transducer element 3 is connected to an A/D converter 10, which converts an analog voltage corresponding to the charge stored by each light receiver into a corresponding digital form. An output from each light receiver of the transducer element 3 in its digital form is fed to a central processing unit (CPU) 11. CPU 11 operates on digital outputs from the converter 10 to calculate an evaluation value Vn (for n=1, 2 . . .) according to a predetermined formula, Vn being an evaluation value for n-th cycle. The evaluation value Vn may assume one of three values of a variable In (In = −1, 0 or 1), which is provided as a decision output. The decision output is supplied to a display driver circuit 12 having three output terminals TA, TB, TC which are connected to display elements DA, DB, DC, formed by light emitting diodes or liquid crystal displays, respectively. These display elements DA, DB and DC indicate, when energized, an out-of-focus condition representing a rear focus, an in-focus condition and an out-of-focus condition representing a front focus, respectively. The variable In derived from CPU 11 causes one of the output terminals TA to TC of the driver circuit 12 to assume "H" level, thereby energizing its connected display element to indicate the respective focussing condition.

Figure 2:
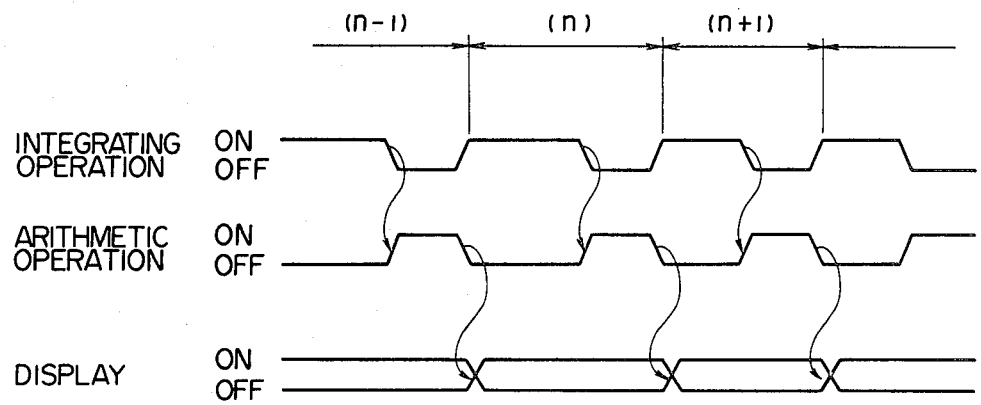
FIG. 2 is a series of timing charts illustrating the relative timing of various signal appearing in the detector shown in FIG. 1.

An integrated output corresponding to the charge stored in each light receiver of the transducer element 3 in accordance with the optical image of an object being photographed, an evaluation output produced by CPU 11, and a display output provided by the elements DA to DC occur in accordance with the timing relationships illustrated in FIG. 2. Thus, when an integrating operation during an n-th cycle is terminated, CPU 11 then performs an arithmetic operation to derive an evaluation value. During the time the integrating operation and the calculation of the evaluation value during the n-th cycle take place, the display of an evaluation value from the (n−1)-th cycle occurs. The evaluation value obtained during the n-th cycle is displayed during the time the integrating operation and the calculation for the (n+1)-th cycle take place, and is determined by the magnitude of the evaluation value from the n-th cycle and the result displayed during the calculation for the n-th cycle.

As shown in FIG. 1, the output from CPU 11 is also fed to a motor drive circuit 14 which is connected to a motor 15 which is in turn connected to drive a taking lens 4. The motor 15 includes a drive shaft 15a connected to a gear 17, which in turn meshes with a rack 16 integrally provided on the taking lens 4. In response to the value of the variable In which corresponds to the evaluation value Vn supplied from CPU 11 and applied to the motor drive circuit 14, the latter produces an output which either causes the motor 15 to rotate in a forward or reverse direction or to stop its rotation.

Figure 3:
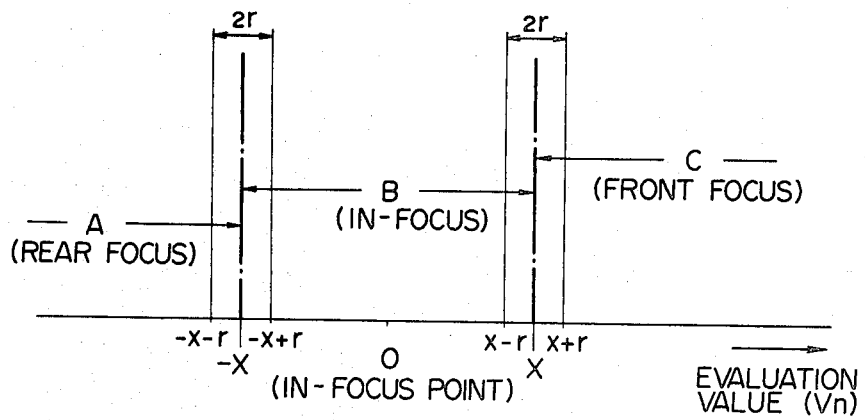
FIG. 3 is a diagrammatic illustration of decision levels with respect to an evaluation output from the detector.
Figure 4:
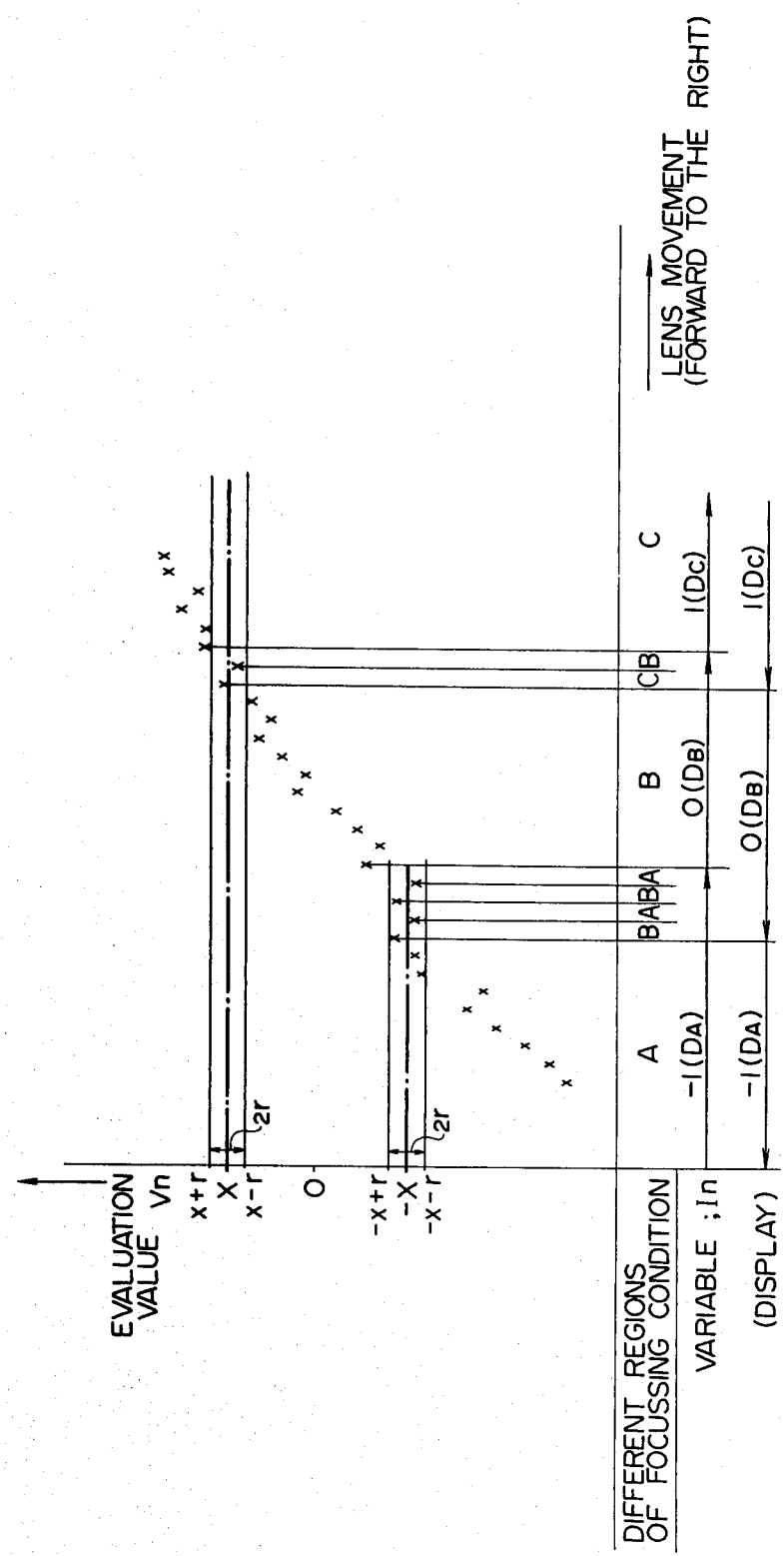
FIG. 4 graphically shows a change in the evaluation value plotted against the forward movement of the lens, illustrating the relationship between the evaluation output and various focussing conditions.

Considering the relationship between the evaluation value Vn and the variable In, reference is made to FIG. 3 in which an in-focus region which is centered on an in-focus point O is shown together with threshold values for decision levels, −X, X with respect to out-of-focus regions A and C, respectively, which represent the rear and the front focus, respectively. Decision levels are located at a spacing of r from the threshold values −X and X, respectively. Specifically, a pair of decision levels −X−r and −X+r are located on opposite sides of the threshold value −X while another pair of decision levels X−r and X+r are located on opposite sides of the threshold value X. CPU 11 determines the value of the variable In as a decision output, as a result of comparison of the evaluation value Vn against these decision levels. As the taking lens 4 is drawn out forwardly, the evaluation value will change through the rear focus region A into the in-focus region B and further into the front focus region C. This would correspond to a movement of the evaluation value as indicated by x marks in FIG. 4. A blur of the camera or the object being photographed or electrical noise may cause the evaluation value to move across the threshold value −X in a manner from A→B→A→B or across the threshold value X in a manner from B→C→B. If the decision level is chosen to be in coincidence with the threshold values −X or X, instability in the display and the lens position would result as mentioned previously.

In the focussing condition detector of the invention, the comparison of the evaluation value Vn against four decision levels −X −r, −X+r, X−r and X+r results in determining one of three values −1, 0 and 1 for the variable In. Assuming that the evaluation value changes in a direction to move through the regions A, B and C sequentially as the taking lens 4 is drawn out forwardly, it follows that In=−1 for Vn≦−X+r, IN=0 for −X+r<Vn≦X+r, and In=1 for Vn>X+r. Conversely, as the evaluation value changes in a direction to move through the regions C and B and A sequentially, it follows that In=1 for Vn≧X−r, In=0 for −X−r≦Vn<X−r, and In=−1 for Vn<−X−r. Thus, when the evaluation value Vn changes from the region A to the region B across the threshold value −X, the decision level used to provide a decision output is equal to −X+r. On the contrary, when moving from the region B to the region A, the decision level used to provide a decision output is equal to −X−r. Also, when the evaluation value Vn moves from the region B to the region C across the threshold value X, the decision level used is equal to X+r while the decision level used is equal to X−r when moving in the opposite direction or from the region C to the region B. In this manner, the level decision incorporates a hysteresis, by employing decision levels when the evaluation value Vn moves from the region A or C into the region B which are different from decision levels used when the evaluation value Vn moves from the region B to either region A or C.

As mentioned previously, the variable In is fed as the decision output from CPU 11 to the display driver circuit 12. For In=−1, the output terminal TA assumes its "H" level to energize the display element DA, which indicates an out-of-focus condition. For In=0, the output terminal TB assumes its "H" level to energize the display element DB, which indicates an in-focus condition. For In=1, the output terminal TC assumes its "H" level to energize the display element TC, which indicates an out-of-focus condition. When the variable In is applied to the motor drive circuit 14, the motor 15 will be driven in the forward direction to draw the taking lens 4 out forwardly for In=−1. For In=0, the rotation of the motor 15 is stopped. For In=1, the motor 15 is driven in the reverse direction to retract the taking lens 4 rearwardly. Accordingly, assuming that the evaluation value Vn−1 from the (n−1)-th cycle exists within the region A and hence the display element DA is energized while the taking lens 4 is drawn out forwardly, and that the evaluation value Vn during the n-th cycle moves into the in-focus region B, the display corresponding to the evaluation value Vn from the n-th cycle is given by maintaining the energization of the display element DA which is based on the evaluation value Vn−1 obtained during the (n−1)-th cycle unless the new evaluation value Vn has sufficiently changed to move past the decision level −X+r into the region B. Accordingly, the taking lens 4 is maintained in its position in which it is forwardly drawn out. The same applies to a change of the evaluation value Vn from the region B to the region A, and also to a change of the evaluation value across the threshold value X between the regions B and C. Hence it will be seen that a change of the evaluation value within a range defined by the quantity 2r across the threshold value −X or X as a result of a blurring of the camera or the object being photographed or electrical noise cannot cause an alternate flashing or flickering of display elements associated with the two corresponding regions, or a small, but rapid movement of the taking lens 4 which would result in a failure to fix its position.

Figure 5:
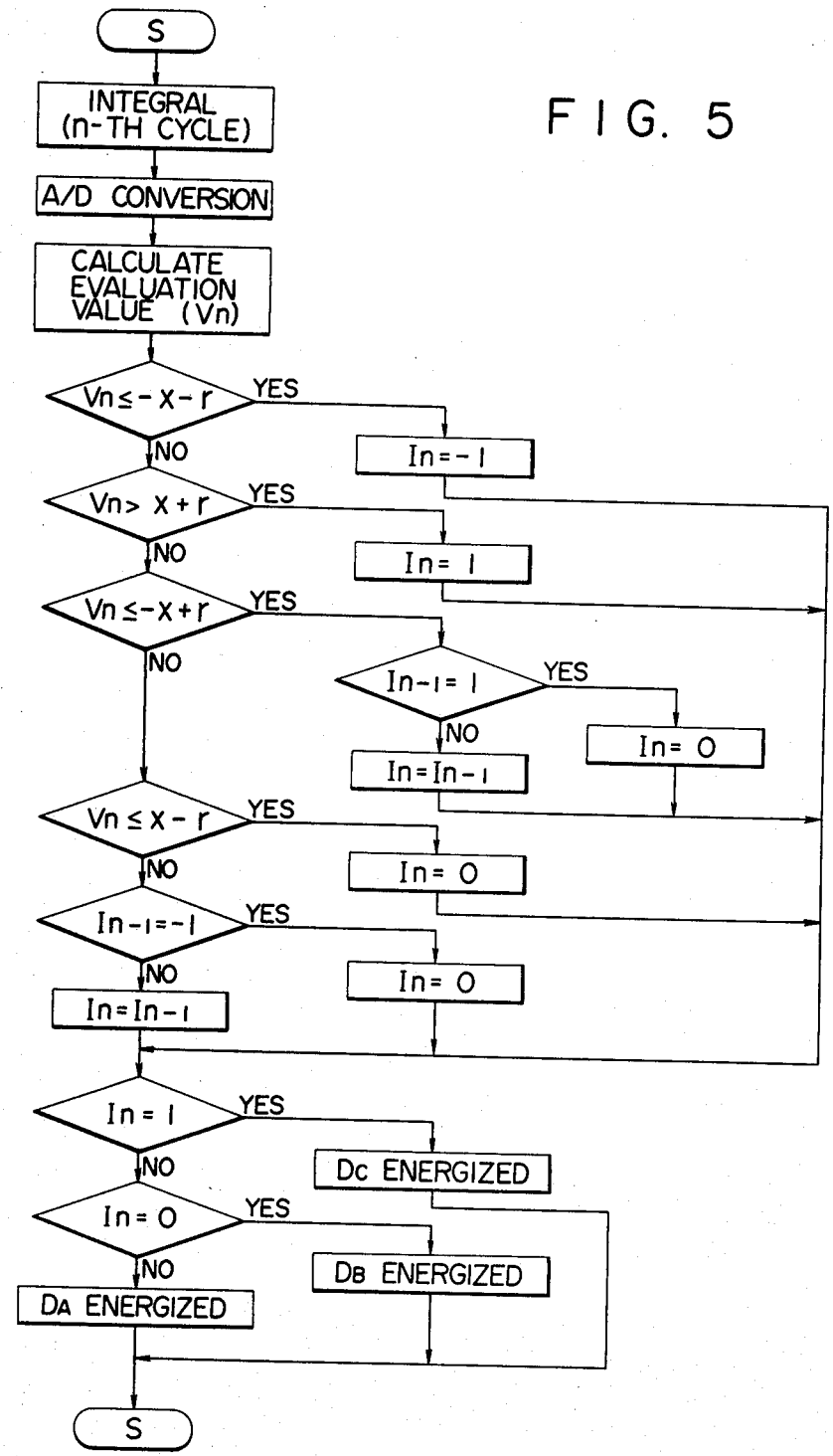
FIG. 5 is a flowchart illustrating the operation of the focussing condition detector shown in FIG. 1.

The operation of the focussing condition detector will be described in detail with reference to a flowchart shown in FIG. 5. When a power switch, not shown, is closed, the operation of the focussing condition detector is started (shown at S in FIG. 5). The optical image of an object being photographed which passes through the taking lens 4 impinges upon the transducer element 3, which integrates such input in accordance with a focussing condition thereof. Assuming that an integrating operation for an n-th cycle is performed, the integrated output is applied to the converter 10 to be converted into digital form, which is then fed to CPU 11, which in turn derives an evaluation value Vn according to a given formula. CPU 11 also compares the evaluation value Vn against decision levels −X−r, −X+r, X−r and X+r, respectively. Initially, a comparison is made to determine if Vn≦−X−r. If the answer is in the affirmative, it then follows that In=−1. This energizes the display element DA connected to the display driver circuit 12, informing to a user that the evaluation value Vn exists substantially within the region A, representing the rear focus condition. In response to the variable In=−1, the motor drive circuit 14 produces an output which causes the motor 15 to rotate in a direction to draw the taking lens 4 out forwardly so as to achieve the in-focus condition.

In the first comparison step mentioned above, if $Vn > -X-r$, a second comparison is made to see if $Vn > X+r$. If the answer is in the affirmative, it follows that In=1. In this instance, the display element DC is energized, informing to the user that the evaluation value Vn exists substantially within the region C, representing the front focus condition. Also, the motor drive circuit 14 causes the motor 15 to rotate in a direction to retract the taking lens 4.

If $Vn \leq X+r$ in the second comparison, a third comparison is made to see if $Vn \leq -X+r$. If the answer is in the affirmative or if $-X-r < Vn \leq -X+r$, a decision is made to see if the variable In−1 from the (n−1)-th cycle is equal to 1 or if the display element DC has been energized during the (n−1)-th cycle. If In−1, it follows that the variable In=0. Accordingly, the display element DB is energized, informing to a user that the evaluation value Vn has moved substantially into the in-focus region B. The motor drive circuit 14 ceases to produce an output which is used to drive the motor 15, thus maintaining the taking lens 4 stationary in the in-focus condition. On the contrary, if In−1 is unequal to 1, it follows that In=In−1. The fact that In−1 is unequal to 1 means that In−1=−1 or In−1=0 during the (n−1)-th cycle and either the display element DA or DB has been energized. The equality In=In−1 under this condition indicates that for Vn which satisfies the inequality $-X-r < Vn \leq -X+r$, the same display as that produced during the (n−1)-th cycle is maintained. The motor drive circuit 14 produces a corresponding output, whereby the motor 15 continues its rotation in the same direction or is maintained at rest.

If $Vn > -X+r$ in the third comparison, a fourth comparison is made to see if $Vn < X-r$. If the answer is in the affirmative or if $-X+r < Vn \leq X-r$, it follows that In=0. Thus the display element DB is energized and the motor 15 comes to a stop. If $Vn > X-r$ in the fourth comparison, or if $X-r < Vn \leq X+r$, a decision is made to see if In−1 or if the display element DA has been energized during the (n−1)-th cycle. If In−1=−1, it follows that In=0, thereby energizing the display element DB to inform to a user that the evaluation value Vn has moved substantially into the in-focus region B. Also the motor 15 comes to a stop. If In−1 is unequal to −1, it follows that In=In−1. The fact that In−1 is unequal to −1 means that In−1=1 or In−1=0 during the (n−1)-th cycle and either display element DC or DB has been energized. The equality In=In−1 under this condition results in the same display as that produced during the (n−1)-th cycle for the evaluation value Vn which satisfies the inequality $X-r < Vn \leq X+r$. The motor 15 continues its rotation or is maintained at rest in the corresponding manner.

As discussed above, different decision levels are used in providing a discrimination between the in-focus and the out-of-focus conditions depending on the direction of movement of the taking lens 4. The difference in these decision levels depends on the ratio of the signal level to the magnitude of noise, or the relationship between the movement of the taking lens and the evaluation value Vn (as represented by the slope of a linear trace of points shown in FIG. 4 which represents the individual evaluation values Vn), but is negligible with respect to the movement of the lens, and therefore presents no problem whatsoever in determining the in-focus condition.

The focussing condition detector according to the embodiment shown in FIG. 1 operates to control the motor 15 associated with the taking lens in accordance with a decision output from CPU 11 in order to achieve the in-focus condition in which the display element DB is energized automatically. However, it is also possible to utilize the output from CPU 11 only for the purpose of displaying the focussing condition, and the taking lens 4 may be driven either manually or by a motor in accordance with the indications provided by the display elements DA to DC.

What is claimed is:

1. A focussing condition detector comprising
    a focussing lens which is movable along an optical axis;
    a photoelectric transducer element disposed at or adjacent to an imaging position of the focussing lens for detecting a focussing condition;
    processing means for performing an arithmetic operation on an output from the transducer element to derive an evaluation value according to a given formula, the processing means providing a decision output indicative of an in-focus or an out-of-focus condition of the focussing lens by comparing the evaluation value against a decision level, a decision level used when an image formed on the transducer element moves from a region representing an in-focus condition to another region representing an out-of-focus condition being different from a decision level which is used when the image moves in the opposite direction, adjacent to a threshold value representing a boundary between the in-focus and the out-of-focus region;
    and display means responsive to a decision output from the processing means to display a particular region which represents the focussing condition of the image.

2. A focussing condition detector according to claim 1 in which the transducer element comprises a plurality of aligned charge coupled devices which define light receivers of a reduced area.

3. A focussing condition detector according to claim 1 in which a pair of decision levels are defined on opposite sides of a threshold value representing a boundary between an in-focus region and an out-of-focus region representing a front pin and spaced therefrom by a given offset value, and another pair of decision levels are defined on the opposite sides of another threshold value representing a boundary between the in-focus region and another out-of-focus region representing the rear focus and spaced therefrom by an offset value.

4. A focussing condition detector according to claim 3 in which the offset value is chosen depending on a blurring between the optics and an object being photographed, electrical noise, the stroke of movement of the focussing lens and a change occurring in the evaluation value.

5. A focussing condition detector according to claim 1 in which the decision output may assume a variable value of −1, 0 and 1 which represent the front focus region, the in-focus region and the rear focus region, respectively.

6. A focussing condition detector according to claim 1 in which the display means comprises display elements connected to three output terminals of a display driver circuit for displaying the front focus, the rear focus and the in-focus condition, respectively, in response to the decision output.

7. A focussing condition detector according to claim 1 in which an output from the transducer element, the arithmetic operation to derive the evaluation value and the display occur at such a timing that the display means displays the result of the arithmetic operation from (n−1)-th cycle during the time the integrating operation for n-th cycle and the arthimetic operation therefor occur.

8. A focussing condition detector according to claim 1 in which the decision output is also fed to a motor drive circuit which is effective to drive the focussing lens into the in-focus condition.

9. A focussing condition detector according to claim 5 or 8 in which the motor drive circuit causes a motor to be driven in a forward or reverse direction or to be stopped when the decision output assumes a value of −1, 1 or 0, respectively.

10. In a camera having a movable taking lens, a drive means for selectively moving said taking lens, in a forward and rearward direction, a photoelectric transducer device for detecting light passing through said taking lens to develop a focussing condition signal $S_{FC}$, representing the focussing condition of the image of the object being photographed, processing means for developing an evaluation value from said focussing condition signal ($S_{FC}$) for controlling the drive means to move the taking lens to bring the image of the object being photographed into focus in accordance with a method comprising the steps of:

providing first and second boundary values (−X) and (+X), which define the boundary of an in-focus region bound on either side by out-of-focus regions respectively to the far and near side of the image of the object being photographed;

providing first and second narrow offset regions extending on either side of each boundary value, the offset region embracing boundary value (−X) being defined by offset boundry values (−r−X) and (+r−X), and the offset region embracing boundary value (+X) being defined by offset boundary values (−r+X) and (+r+X), where +X<+r and (+r−X)<(−r+X);

sampling the signal $S_{FC}$ at periodic intervals to determine its value;

comparing the sampled value of the signal $S_{FC}$ with the offset boundary values in a predetermined sequence;

operating said drive means to move the taking lens into the in-focus region whenever the sampled value of $S_{FC}$ is less than (−r−X) or is greater than (+r+X);

halting said drive means whenever the sampled value of $S_{FC}$ is greater than (−X+r) and less than (+X−r); and moving said drive means in a direction determined by the previous sampled value of $S_{FC}$ whenever the presently sampled value of $S_{FC}$ lies in one of said offset regions.

* * * * *

UNITED STATES PATENT AND TRADEMARK OFFICE
CERTIFICATE OF CORRECTION

PATENT NO. : 4,470,683

DATED : Sep. 11, 1984

INVENTOR(S) : Yukio Nakajima

It is certified that error appears in the above-identified patent and that said Letters Patent is hereby corrected as shown below:

Column 1, line 60 change "signal" to --signals--.

Column 8, line 16 change "+X<+r" to --+X>+r".

Signed and Sealed this

Second Day of April 1985

[SEAL]

Attest:

DONALD J. QUIGG

Attesting Officer

Acting Commissioner of Patents and Trademarks